United States Patent
Smith et al.

[11] Patent Number: 5,951,015
[45] Date of Patent: Sep. 14, 1999

[54] INTERACTIVE ARCADE GAME APPARATUS

[75] Inventors: Douglas H. Smith, Spencerport, N.Y.; James E. Stoneham, Menlo Park, Calif.; William P. Fricke, Fairport, N.Y.; Anthony L. Creed, Los Altos, Calif.; Peter N. Skillman, San Carlos, Calif.; Johnson K. Chow, San Francisco, Calif.

[73] Assignee: Eastman Kodak Company, Rochester, N.Y.

[21] Appl. No.: 09/090,023

[22] Filed: Jun. 10, 1998

Related U.S. Application Data

[60] Provisional application No. 60/049,145, Jun. 10, 1997.

[51] Int. Cl.$^6$ .................................................. F41N 9/14
[52] U.S. Cl. ............................................ 273/358; 463/34
[58] Field of Search ............................. 273/358; 463/34

[56] References Cited

U.S. PATENT DOCUMENTS

| | | |
|---|---|---|
| 4,006,903 | 2/1977 | Barish . |
| 5,171,012 | 12/1992 | Dooley . |
| 5,242,306 | 9/1993 | Fisher . |
| 5,566,951 | 10/1996 | Dart et al. ................................ 273/358 |
| 5,573,247 | 11/1996 | Ridge . |
| 5,595,389 | 1/1997 | Parulski et al. . |
| 5,621,492 | 4/1997 | Beveridge et al. . |
| 5,623,642 | 4/1997 | Katz et al. . |
| 5,649,706 | 7/1997 | Treat, Jr. et al. ........................ 273/358 |

*Primary Examiner*—William H. Grieb
*Attorney, Agent, or Firm*—Francis H. Boos, Jr.

[57] ABSTRACT

An interactive game apparatus in which players throw projectiles, such as soft balls, against a display panel on which a target image is projected and contact sensitive elements aligned with target areas in the projected image are activated by a hit from the thrown projectile to initiate a change in the projected image uniquely associated with the target area hit and the player who threw the projectile. An embodiment in the context of a tic-tac-toe game is described. A number of embodiments for identifying specific projectiles with a player responsible for throwing the projectile are described.

8 Claims, 6 Drawing Sheets

INTERACTIVE ARCADE GAME APPARATUS

CROSS REFERENCE TO RELATED APPLICATION

Reference is made to and priority claimed from U.S. Provisional Application Ser. No. 60/049,145, filed Jun. 10, 1997, entitled INTERACTIVE ARCADE GAME APPARATUS by Douglas H. Smith et al.

FIELD OF THE INVENTION

The invention relates generally to the field of interactive arcades games. More specifically, it relates to such games in which balls or similar projectiles are thrown against a video enhanced game board for accumulating game scoring, the game board having player selected enhancements that personalize the game presentation.

BACKGROUND OF THE INVENTION

Electronic arcade games are known in which a video presentation is manipulated by a player to modify the video presentation in accordance with progress of a particular game being played or to control an element of the scene, such as a car, to vary the position of the scene element as the video scene changes. Such games requires a somewhat stationary player to manipulate game controls, such as a joystick, to control the progress of the video game.

More active games are also known in which the player or players toss, roll or slide projectiles toward a target and cumulative scoring is visually presented on a display. Video displays may also be used in such games to provide a degree of animation in the scoring display.

There is a need for an arcade style of game that give the player participants the ability to actively participate in the game as by tossing objects at a game display and allows the player participants to customize the display to personalize elements of the display thereby adding a high degree of interest in the game.

SUMMARY OF THE INVENTION

In accordance with the invention, there is provided interactive video game apparatus comprising a video display panel having a multi-dimensional array of contact responsive elements responsive to impingement of projectiles tossed by player participants to register a characteristic of the contact between the projectile and the display panel; a video display projector for displaying a video game on the display panel, the game elements being related to the position of the contact responsive elements on the display panel such that such registered characteristic of contact by the projectile with the display panel contributes to scoring in the displayed video game; player operated video display element creation means for allowing player participants in the game to create and display customized video elements for display in conjunction with display of the video; and means for displaying one or more of said customized display elements as part of the game display in association with contact between said projectiles and the contact sensitive elements of the display panel.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
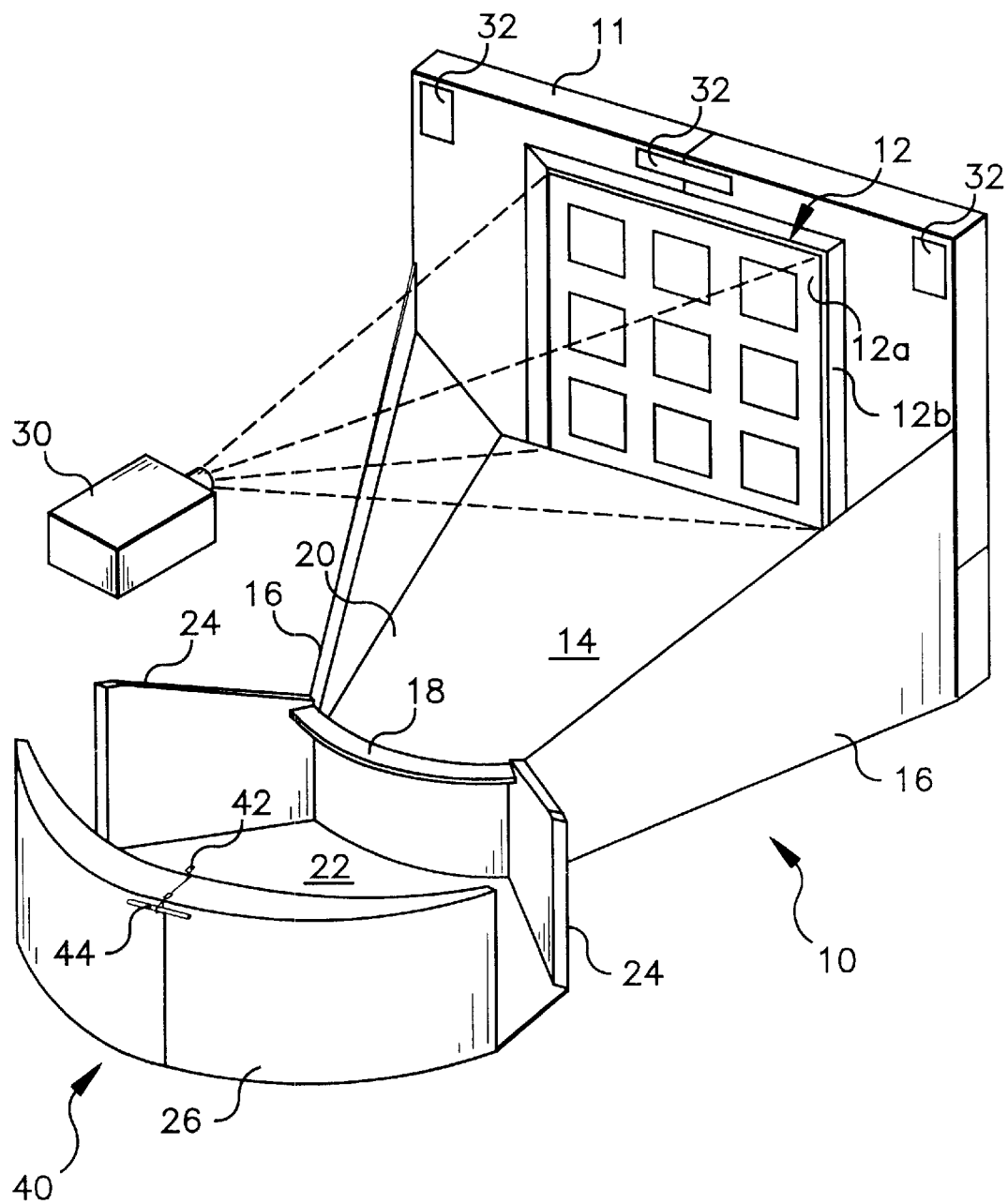
FIG. 1 is a front quarter perspective view of game apparatus of the invention.
Figure 2:
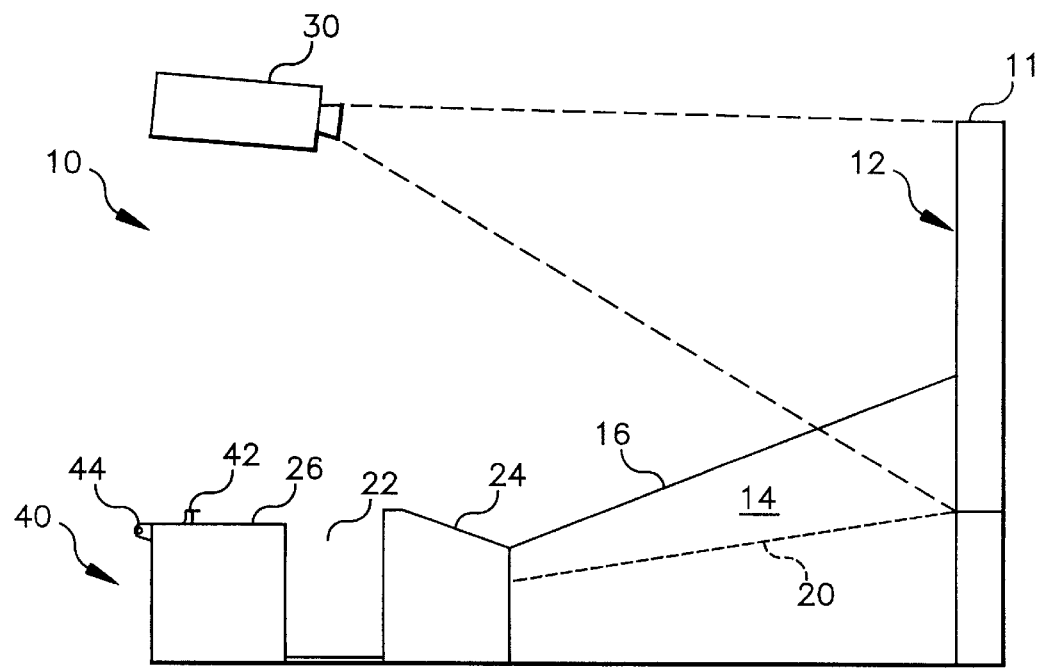
FIG. 2 is a side view of the game apparatus of FIG. 1.
Figure 3:
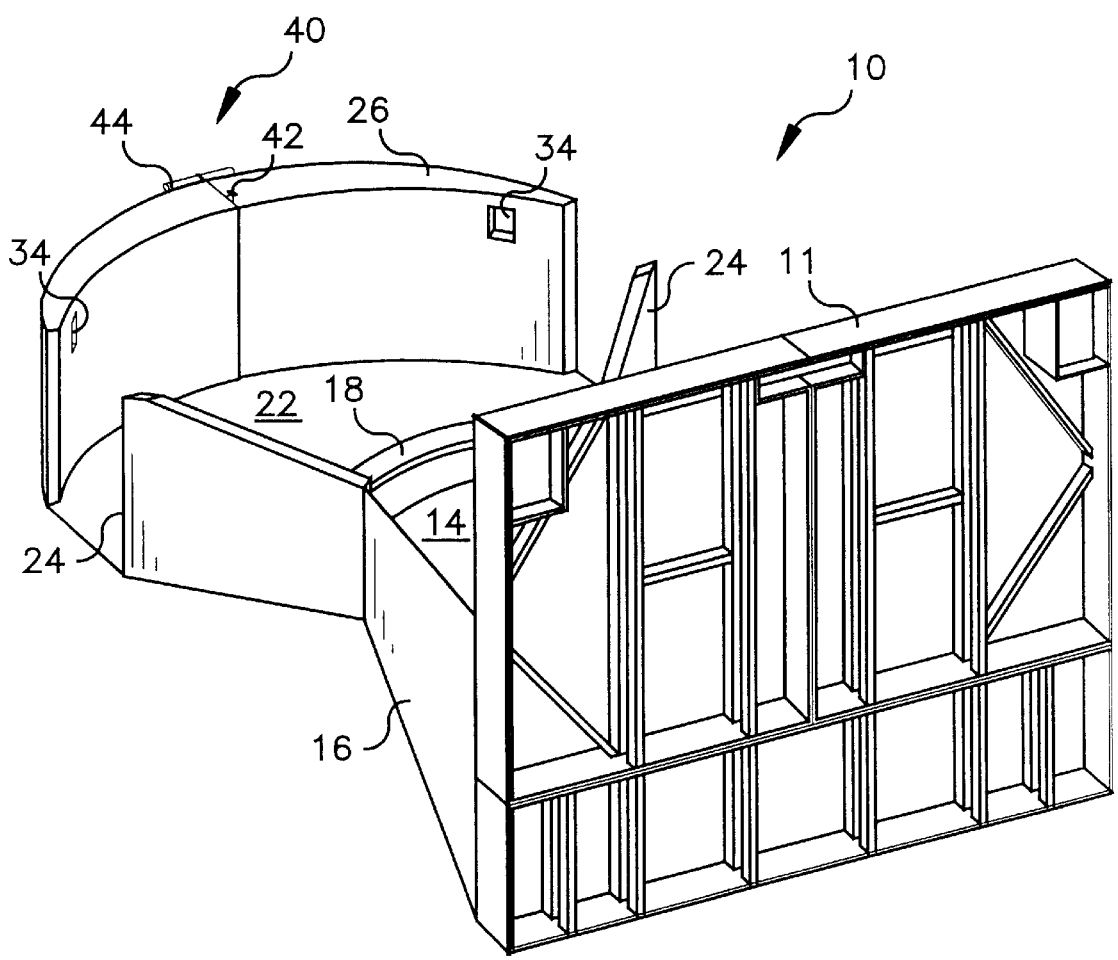
FIG. 3 is a rear quarter view of the game apparatus of FIG. 1.

Referring jointly to FIGS. 1–3, a game platform 10 includes a display panel wall 11 on which is mounted a large display panel 12. A ball containment area 14 is provided with sidewalls 16, a curved end wall 18 and a sloping ramp 20 used to contain balls thrown by players after bouncing off the display panel 12 and also to separate the display panel 12 from a player area 22 where players stand during the game. The player area 22 is defined by side walls 24 fanned outwardly to provide room for the players to move about and by a curved rear wall 26. Preferably the player area 22 is large enough to accommodate at least two players simultaneously. A ceiling mounted digital or video image projector 30 is positioned over the game platform and operates to project a graphical image of a game layout directly onto the display panel 12. Alternatively, a rear projector may be employed. In the embodiment shown, a tic-tac-toe game is projected onto the screen. Loudspeakers 32 are mounted on either side of the display screen and centrally over the screen. As shown in FIG. 3, rear loudspeakers 34 are mounted in the rear wall 26. The effect is to provide surround sound effects associated with the game that is focused primarily onto the player area to enhance enjoyment of the game.

An image capture station 40 is positioned on the rear wall 26 and comprises a digital camera 42 mounted on a vertically reciprocal frame 44 which can be raised and lowered. The image capture station 40 is configured on the movable frame with the camera 42 pointed away from the display panel 12 to allow easy capture of a player's image by positioning the camera at a convenient height level with the player's face. During image capture, the player stands at the rear of the platform outside the player area facing the screen 12. With the camera ON, the player can view his image on the display panel to properly position the camera. When the player is satisfied with the displayed image, a button is pressed to capture the image which is then stored for subsequent use during the playing of the game.

Figure 4:
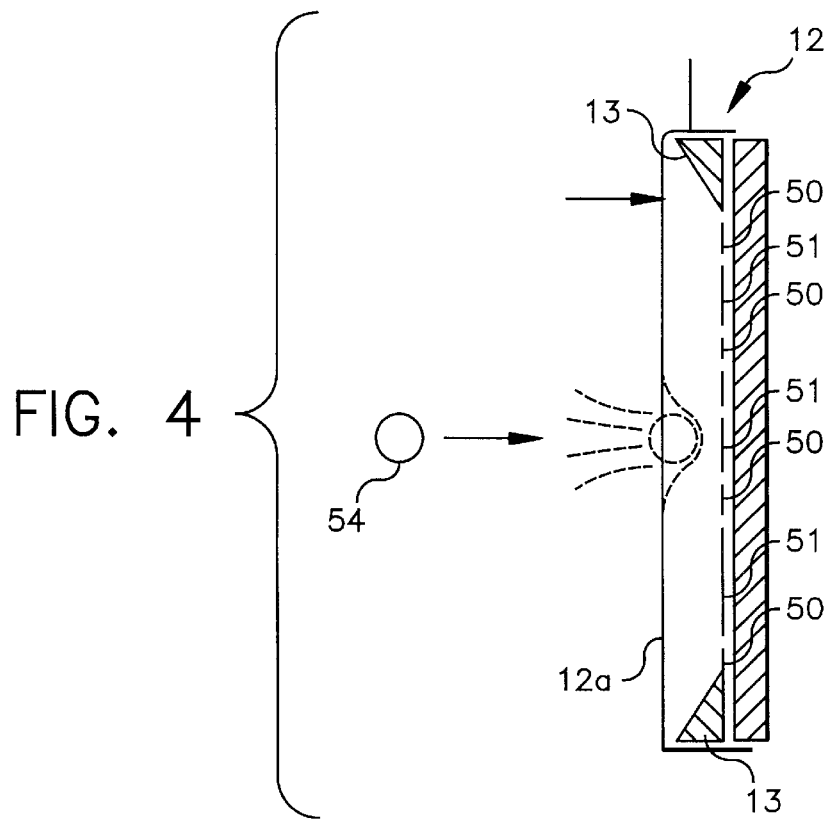
FIG. 4 is a side sectional view of a display panel with projection screen and contact sensitive elements useful in the game apparatus of FIG. 1.

Referring to FIG. 4, the display panel 12 comprises a large flat projection screen 12a spanning a frame which may be 8' wide and 6' wide or whatever other size is appropriate to the platform configuration. The display panel includes a rear wall surrounded by a frame 13. The projection screen 12a is stretched across the frame and is held slightly forwardly spaced from the rear wall. The projection screen is an electrically conductive cloth having a reflective front surface. Target segments 51 of electrically conductive material and corresponding to the nine squares of the tic-tac-toe game projected onto the front of the projection screen are positioned on the rear wall in alignment with the displayed game squares and are slightly spaced rearwardly of the projection screen. Off target segment areas 50 around and between the target segment areas 51 are covered by a similar electrically conductive material. The projection screen 12a, target segment areas 51 and off-target segment areas 50 serve as electrodes comprising an array of contact sensitive elements responsive to balls 54 or other projectiles thrown by the players against the display panel 12 to register a characteristic of the thrown projectile, such as position on the panel. When a ball 54 is thrown by a player, the ball deforms the large conductive screen material, as shown, and brings it into contact with one of the conductive elements 50,51 on the rear wall of the display panel to close a corresponding electrical circuit and thereby register a "hit", if contact is made with a target element 5 1, or a "miss" if contact is made with an off-target element 50.

Figure 5:
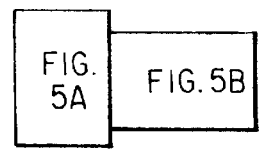
FIG. 5 is an electrical schematic diagram of a tic-tac-toe game implemented in the apparatus of FIG. 1.
Figure 5A:
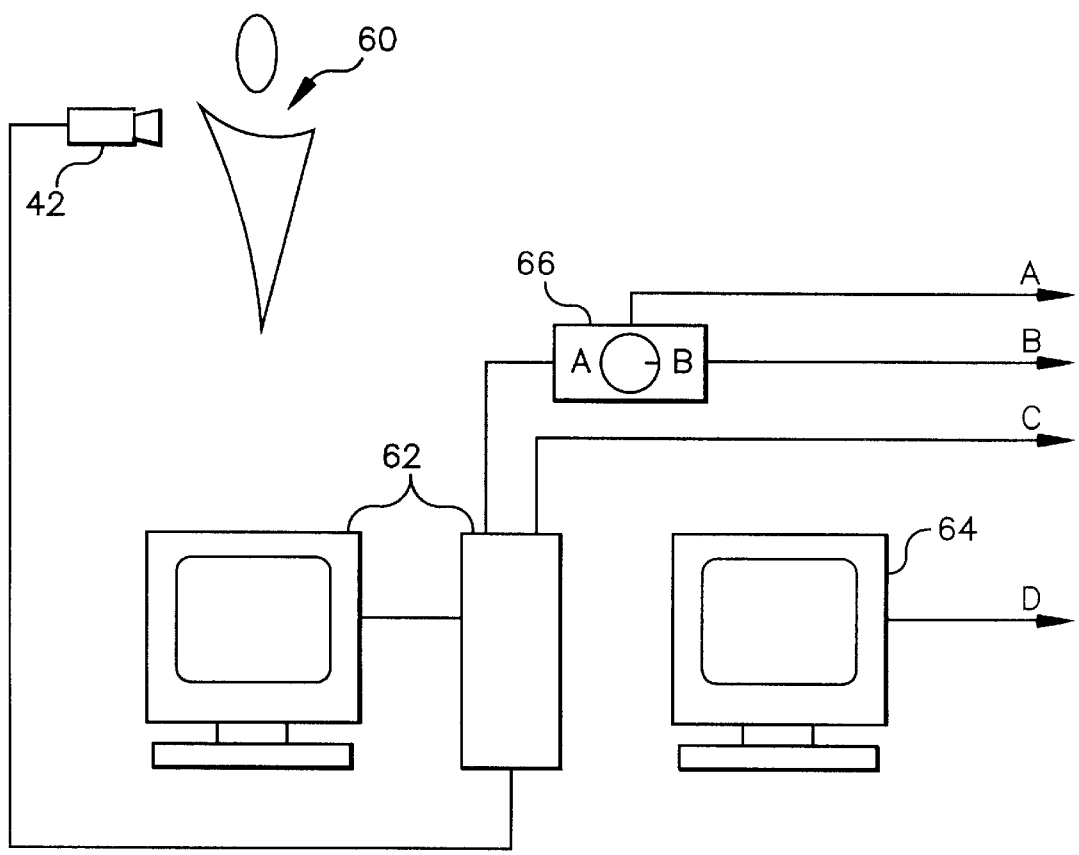
Figure 5B:
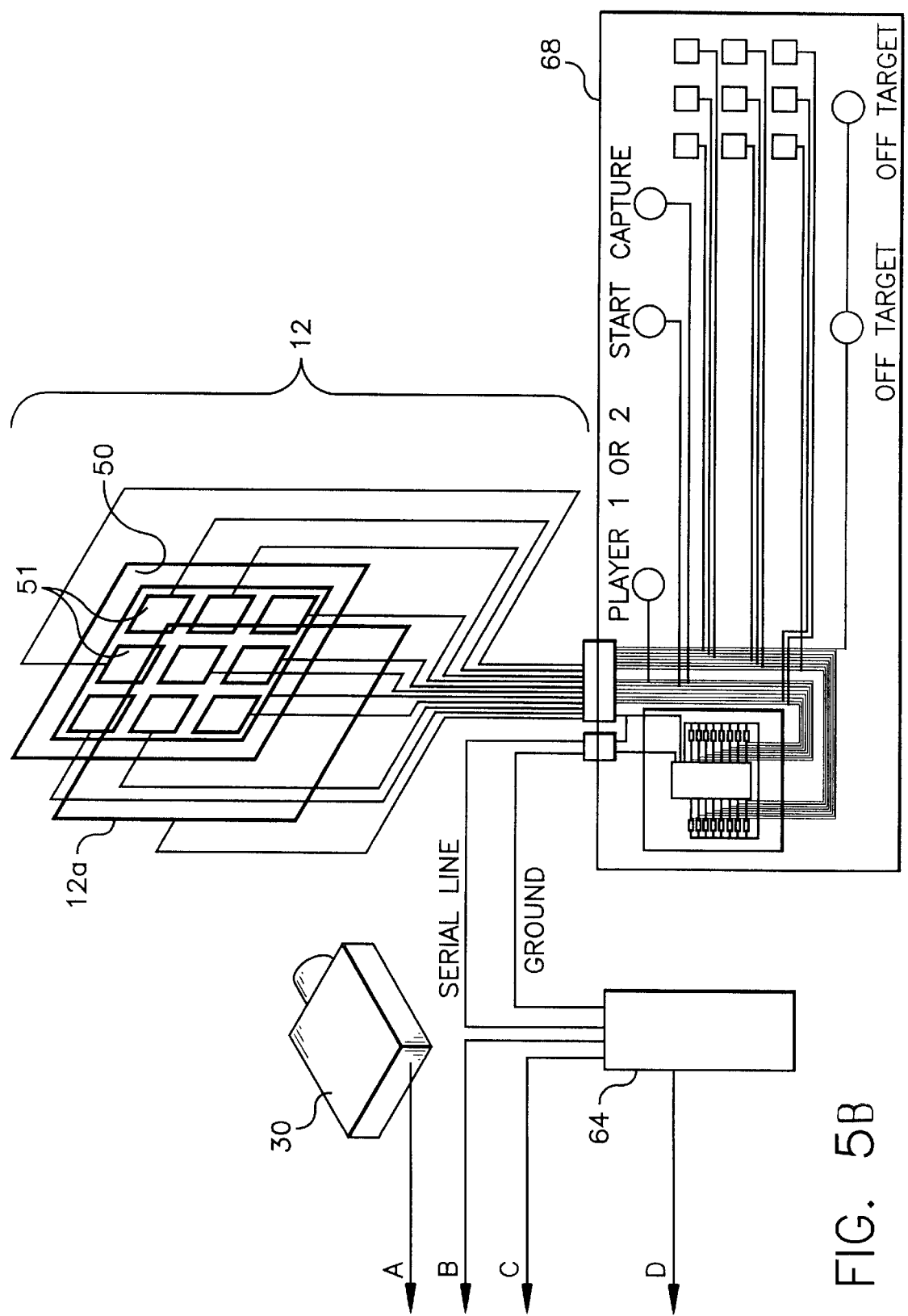

FIG. 5 shows a schematic diagram of an electrical system for implementing the tic-tac-toe game example. In this illustrated embodiment, the video image of a player 60 captured on digital camera 42 is communicated to a first computer 62 for storage and access during operation of the game. A second computer 64 is provided for presentation of the video game displayed onto the display panel. A video switch 66 provides for selective access and projection by video projector 30 of the player image from the computer 62 during the image capture operation and for projection of the game from computer 64 during game operation. A control button and sensor switch box 68 is connected to the display panel and to the computer. When a thrown ball hits on a target area, the computer recognizes the "on-target" hit and creates a video indication in the display signifying the hit. Different audio queues are generated and played back through the loudspeakers to signify on-target and off-target throws. Visually, an on-target hit can be indicated visually by displaying the player's image in the square hit by the ball.

When players throw in sequence, the determination of which ball was thrown for the purpose displaying the corresponding image can be pushing a player designating button. However, game play can be enhanced and made more exciting by allowing both players to throw balls simultaneously to inject time as a function of the play. The issue of recognizing which player threw the ball may be addressed using a means to detect differences in the style of ball being thrown, in which each player would be assigned a different style ball. For example, one style ball may be covered in electrically conductive material and the second style ball covered in non-conductive material. A simple, low power radar type detector would be used to differentiate between the conductive and non-conductive ball striking the display panel. An alternative means of sensing ball type would use balls having different degrees of optical reflectivity, for example, one highly reflective and the other non-reflective. An array of IR transmitters and sensors would be positioned at the periphery of the target area. When a ball reflective in the IR band came in close proximity to the target area, the reflected IR would be sensed by the array of IR sensors and would indicate the type ball thrown. In contrast, if a non-IR reflective ball came in proximity to the target area, it would not reflect IR radiation to the array of sensors and would indicate a ball of the second style.

To still further enhance enjoyment of game play, it may be preferable not to differentiate ball styles directly, i.e. it being preferable to use balls all of the same style, since competition for available resources adds to the excitement of the play. With such an arrangement, it becomes necessary to provide secondary means for associating the thrown ball or other projectile with the player who threw it. Several examples of how balls striking the display panel may be differentiated will now be considered. In one example, a scanning laser curtain type detection system that allow the determination of trajectory and ball speed is used. Two laser curtains are positioned some physical distance apart in the direction of the player area to the display panel. When the thrown projectile successively breaks the scanning laser beam, data received is used to determine projectile direction and speed. This allows the player who threw the projectile to be determined based on the direction of the ball as it approaches the display panel.

Another potential projectile identification arrangement utilizes a pressure sensitive matte underneath the player area that the game player stands on. At the time of the throw, changes in pressure profile would be recognized and the projectile credited to the appropriate player. In another example, the projectiles would be coated with a phosphorescent coating which would be made to fluoresce for a short period when passing through a UV activation region. The UV activation region would be aligned with one side of the player area so that as that player throws his projectiles, they pass through the region to be activated and the other players projectiles do not pass through the UV region and are not activated. An appropriate optical detector is positioned at the target area to detect the activated projectile and credit the hit to the appropriate player. In another example, the projectiles are equipped with a piezo-electric device that emits light upon striking the target surface. Each projectile could have its own unique light signature. The player would initiate a throw by first striking the ball against a detection device at the throw station to identify the projectile's light signature to the particular player. In yet another example, the projectiles would be configured such that they all contain a small embedded antenna, each with a unique frequency signature. The player picks a projectile at random and activates it by passing it over a read station that identifies the particular projectile by its frequency signature. At the target screen, a second interrogation system (an active antenna field) identifies the thrown ball and credits it to the appropriate player. In each of the five examples just described, a secondary position sensor such as described initially above would be required to determine the location of the projectile hit on the display panel.

Figure 6:
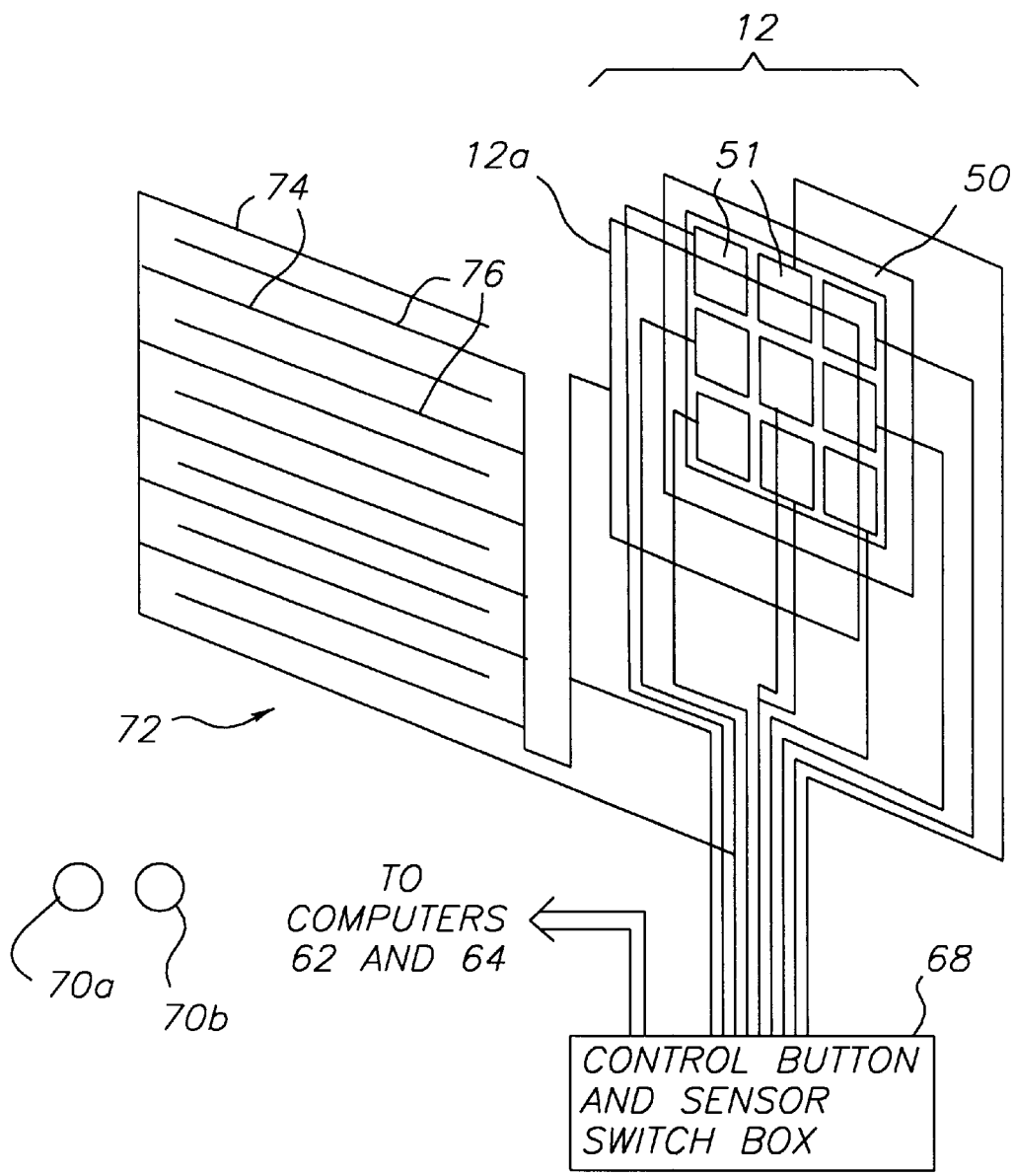
FIG. 6 is an alternative embodiment of the electrical schematic diagram of FIG. 5.

Another preferred embodiment of the invention is shown in FIG. 6. In this embodiment, the screen apparatus and computer arrangement for the location of a projectile (ball) hit on the screen is the same as described above. The present embodiment involves an alternative modification for determining which player threw the ball. In this embodiment, balls 70a and 70b of two distinct resistivities (for example, conductive and non-conductive, respectively) are used. A conductive silk screen mesh 72 is positioned over the display panel 12. By use of either a scanning keypad program or a full-time multi-channel measurement program in the computer 64, the resistance of a ball impinging on the mesh 72 can be determined at the time of impact. Based on the average value of the measured resistance, the resistance signature of the ball can be determined and hence the player who threw the ball is identified. This can be readily accomplished at the start of the game by the players inputting the color of their respective balls, the ball color being associated with the resistive characteristic of the respective balls. Mesh 72 may comprise spaced-apart alternating 5 volt and ground "sense" conductive wires 74 and 76, respectively, distributed over the play area 12a of the display panel 12. The wires are sized small enough, for example 0.007 inches in diameter, to not obscure the projected video game display. When a conductive ball 70a comes in contact with the target area, the wires "shorted", creating a momentary "high" signal by the computer 64, thereby registering the player using the conductive balls. In a like manner, the player throwing a non-conductive ball would not short out the wires and would therefor not register a "high" signal thereby identifying a second player. More than two players can be accommodated by employing ball sets of differing resistivities and employing resistance measurement, as described above, to identify which of three or more players scored the hit resistivity In at least one example described above, reference is made to throwing a ball or other projectile at the display screen with a successful hit resulting in the player's previously recorded image being projected in the hit target area, e.g. a square in the tic-tac-toe game. An extension of this is to merge the real and virtual worlds further by changing the projectile as it hits the screen into some themed object (such as a flaming tomahawk, a spear, etc.) which maintains the same relative speed and trajectory as the real thrown projectile. A similar example would be video golf games wherein the player hits the ball and at the moment it strikes the projection screen, a "virtual" (projected) golf ball is seen to travel through the air on the same relative trajectory as the real ball. In a further modification, the projectile does not need to be a ball—it in itself can be a themed object to distort differences between real and virtual worlds. Similarly, the virtual projectile can completely change into some different item, such as a pie, which would strike and mess up the player's projected image in the target area (or in a remote display area). In another example, the target areas could represent construction and the projectile would change into the construction item that would allow the player to build a virtual environment, e.g. the elements of a building with progressively added blocks or a garden with progressively added flowers, sun, grass, etc. As a further valiant, the virtual space can be made to move past the thrown object when it strikes the screen. This would provide the sensation of traveling through the virtual world from the projectile's perspective. Non-topographical transformations can also be imposed on the thrown projectile at the moment of impact with the projection screen, such as a change in acceleration or an explosion.

The invention has been described in detail with particular reference to certain preferred embodiments thereof, but it will be understood that variations and modifications can be effected within the spirit and scope of the invention.

What is claimed is:

1. Interactive video game apparatus comprising:
   a video display panel having a multi-dimensional array of contact responsive elements responsive to impingement of projectiles tossed by player participants to register a characteristic of the contact between the projectile and the display panel;
   a video display projector for displaying a video game on the display panel, the game elements being related to the position of the contact responsive elements on the display panel such that such registered characteristic of contact by the projectile with the display panel contributes to scoring in the displayed video game;
   player operated video display element creation means for allowing player participants in the game to create and display customized video elements for display in conjunction with display of the video; and
   means for displaying one or more of said customized display elements in association with contact between said projectiles and the contact sensitive elements of the display panel.

2. The apparatus of claim 1 wherein said creation means comprises an image capture and recording means.

3. The apparatus of claim 2 wherein said image capture means is coupled to said video display projector for projection of said image on the display panel while said image is being composed prior to capture and recording.

4. The apparatus of claim 1 wherein said customized display element comprises a virtual representation of the thrown projectile.

5. The apparatus of claim 2 wherein said customized display element includes an image of the player and an additional element that interacts with the displayed player image.

6. The apparatus of claim 1 wherein said customized display element is a topographical transformation of the thrown projectile into another representation different from said projectile.

7. The apparatus of claim 1 further including means for differentiation of thrown projectiles to associate each projectile with the player responsible for throwing the projectile.

8. The apparatus of claim 1 wherein said projectiles have different resistivities associated with respective different players, said video game apparatus further includes resistance measuring apparatus and said video display panel includes a mesh of spaced-apart conductive wires positioned over the display panel and coupled to resistance measuring apparatus whereby a projectile impinging on said mesh can be associated with a particular player by measuring resistivity of said projectile.

* * * * *